UNITED STATES PATENT OFFICE.

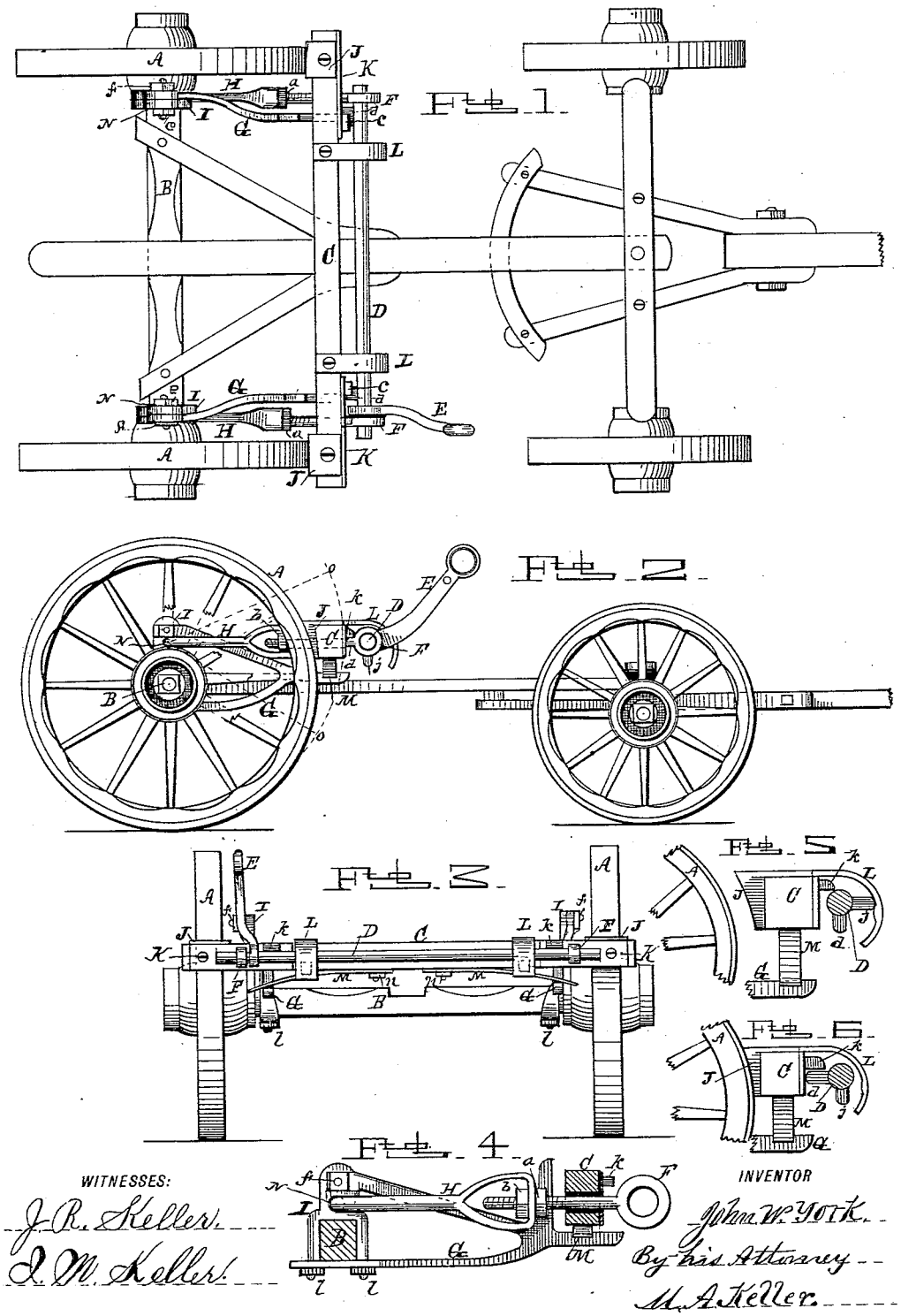

JOHN WESLEY YORK, OF NOLENSVILLE, TENNESSEE.

VEHICLE-BRAKE.

SPECIFICATION forming part of Letters Patent No. 557,747, dated April 7, 1896.

Application filed December 26, 1895. Serial No. 573,263. (No model.)

*To all whom it may concern:*

Be it known that I, JOHN WESLEY YORK, a citizen of the United States, residing at Nolensville, in the county of Williams and State of Tennessee, have invented a new and useful Brake for Vehicles, of which the following is a specification.

My invention relates to improvements in brakes for vehicles, in which two supporting-brackets are secured to the rear axle and two compensating coupling-rods are pivoted into the brackets at a point above the axle and are connected near their forward end to the brake-beam. A cam-shaft is journaled in said compensating rods in front of the brake-beam. Said cam-shaft is provided with a lever by which it may be vibrated and cause the cams to force the brake-beam back against the wheels. Two springs are secured to the under side of the brake-beam and rest with their free ends on top of the projecting brackets. By this arrangement the brake-shoes are applied at some distance above the line of the axle center, and, by reason of the position of the pivots of the compensating coupling-rods and the said springs, the brake becomes automatic as soon as the shoes come in contact with the wheels. I attain these objects and others by the mechanism illustrated in the accompanying drawings, in which—

Figure 1 is a top view complete with the running-gear of a wagon and in the position when locked to the wheels. Fig. 2 is a side view of same with portion of the spokes removed to better show the position of the parts. Fig. 3 is a front view with the front gear of the wagon removed. Fig. 4 is a side view of one of the apparatus detached from the wagon; and Figs. 5 and 6 are sectional end views of the brake-beam and cam-shaft, showing the two positions of the latter when both in and out of action.

Similar letters refer to similar parts throughout the several views.

The letters A A represent the two hind wheels, and B the axle for the same.

I is a saddle-clip, of which there are two, which are secured to the axle B, as shown in Fig. 4. A bracket G is secured to this saddle by the bolts and nuts $f f l l$ and thus becomes rigid with the axle. There are two rods H H pivoted into the said saddle at N, which is above the axle. The other ends of these rods are in the form of a stirrup, into which are secured the eyebolts F F by the nuts $a\ b$. These eyebolts pass transversely through the brake-beam C, which latter can move freely on said bolts.

There are two springs M M secured to the under side of the beam C, as is clearly shown in Fig. 3. The free ends of these springs rest on the projecting ends of the brackets G G, as shown, and thus supports the brake-beam. There are detachable brake-shoes J J bolted to the ends of the beam C, and wear-plates K K are secured on the ends on the front side of the said beam, each of which is provided with a stop $k$. A brake-shaft D is journaled into the eyebolts, as shown, and a hand-lever E is rigidly secured on this shaft, and four cams $d\ d\ j\ j$ and two cam-plates L L, are secured on the brake-beam C, which overhang the said cam-shaft D. Now when the shaft D is vibrated by the lever and in the position as shown in Figs. 1, 2, and 6 the cams $d\ d$ force the beam C with the shoes J J up against the tires of the wheels A A, and the friction of the shoes on the wheels will carry down the brake-beam C and upon the springs M M. Now note the position of the pivot N of the rods H H and the dotted lines O O in Fig. 2, and it will be seen that the brake becomes at once automatic as soon as the brake-shoes come in contact with the wheels, as the wheels are eccentric to the pivots N N of the connecting-rods H H. Now when the lever E is pushed back the cams $d\ d$ move down and away from the stops $k$ and wear-plates K, and the cams $j\ j$ come in contact with the cam-plates L L, and thus draw the brake-beam C away from the wheel A A, as is shown in Fig. 5, and the springs M M raise the beam up to its normal position, and thus allow the brake to be again applied at a point eccentric to the axis of the wheels to the pivots on which the brake is hinged.

By the nuts $a\ b$ the eyebolts F F can be shortened and the wear of the shoes J J taken up.

It will be seen that this brake is not attached to the body or box of the wagon and can readily be removed from the wagon by taking off the nuts $f\ f$ from the rods H H where they connect the saddles I I. The brackets G G would not be in the way to use the wagon without the brake.

Having thus fully described the construction and operation of my invention, what I therefore claim as my invention, and desire to secure by Letters Patent, is—

1. In an eccentrically-acting brake for vehicles, the combination with the wheels and their axle, of two clip saddles or brackets rigidly secured to said axle and projecting forward on the inside of the wheels, a brake-beam having two springs and supported on said brackets by the springs, connecting-rods pivoted in said brackets or saddles at a point above the axle and movably connected to the brake-beam, and a cam-shaft having an operating or hand lever journaled in said rods and operating in conjunction with the brake-beam, substantially as described.

2. In an eccentrically-acting brake for vehicles, the combination with the wheels and the axle of the same, of two brackets rigidly connected to said axle, a brake-beam having two springs supporting the beam on said brackets, connecting-rods passing transversely and loosely through said beam and having their rear ends pivoted into said brackets at a point above the axle, a cam-shaft having a hand-lever and journaled in the forward end of said connecting-rods, and means connecting the cams of said shaft with the brake-beam and cause said brake to operate, substantially as described.

3. In an eccentrically-acting brake for vehicles, the combination with the wheels and the axle of said wheels, of two brackets secured to said axle next to the inside of said wheels, and projecting forward beyond the wheels, a brake-beam supported on said brackets on yielding devices, two rods having compensating devices, and passing transversely through said brake-beam and pivotally connected to said brackets at a point above said axle, and a brake-operating shaft provided with cams operating in conjunction with said beam and alternately move the beam to and from the said wheels as said shaft is vibrated, substantially as described.

4. In an eccentrically-acting brake for vehicles, the combination with the wheels and the axle for the same, of two brackets secured to said axle, a brake-beam yieldingly mounted on said brackets, two rods connected to said beam and having their rear ends pivoted into said brackets at a point above said axle, a cam-shaft having a hand-lever for vibrating it cams on said shaft and means connecting said cams and shaft with said connecting-rods and the brake-beam, whereby said beam is with its brake-shoes thrown in and out of contact with the said wheels, as said shaft is vibrated, and compensating means connected with said rods, whereby they may be shortened as the brake-shoes wear down, all substantially as described.

5. The combination with the axle and the wheels of the same, of two clip-saddles I, supporting-brackets G, secured to said saddles and said axle, a brake-beam C, having the brake-shoes J, the wear-plates K, with the stops $k$, the cam-plates L, and the supporting-springs M, two compensating rods H, movably connected with said brake-beam and pivoted in said saddles or brackets at a point above said axle, a vibrating shaft D having a hand-lever E, journaled into said rods in front of said brake-beam cams $d$, and $j$ on said shaft, and operating in conjunction with said cams as said shaft is vibrated, substantially as shown and described.

JOHN WESLEY YORK.

Witnesses:
L. W. BUFORD,
WM. HOUSE.